US012563582B2

(12) United States Patent
Raghavan et al.

(10) Patent No.: US 12,563,582 B2
(45) Date of Patent: Feb. 24, 2026

(54) TECHNIQUES FOR DETERMINING BEAMS FOR FULL DUPLEX WIRELESS COMMUNICATIONS

(71) Applicant: QUALCOMM Incorporated, San Diego, CA (US)

(72) Inventors: Vasanthan Raghavan, West Windsor Township, NJ (US); Andrzej Partyka, Bedminster, NJ (US); Junyi Li, Chester, NJ (US); Kapil Gulati, Belle Mead, NJ (US); Jung Ho Ryu, Fort Lee, NJ (US); Tianyang Bai, Somerville, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 104 days.

(21) Appl. No.: 17/084,382

(22) Filed: Oct. 29, 2020

(65) Prior Publication Data

US 2021/0144725 A1    May 13, 2021

Related U.S. Application Data

(60) Provisional application No. 62/933,157, filed on Nov. 8, 2019.

(51) Int. Cl.
H04L 5/14        (2006.01)
H04B 7/06        (2006.01)
(Continued)

(52) U.S. Cl.
CPC ........ H04W 72/542 (2023.01); H04B 7/0696 (2023.05); H04W 72/046 (2013.01)

(58) Field of Classification Search
None
See application file for complete search history.

(56) References Cited

U.S. PATENT DOCUMENTS

| | | | | |
|---|---|---|---|---|
| 10,547,435 B2 * | 1/2020 | Hsu | ........................ | H04W 52/24 |
| 10,574,304 B2 * | 2/2020 | Koskela | ............. | H04B 7/06952 |

(Continued)

FOREIGN PATENT DOCUMENTS

WO        WO-2019208994 A1 * 10/2019

OTHER PUBLICATIONS

International Search Report and Written Opinion—PCT/US2020/058262—ISA/EPO—Apr. 25, 2021.

*Primary Examiner* — Sithu Ko
(74) *Attorney, Agent, or Firm* — Arent Fox LLP /Qualcomm Incorporated

(57)        ABSTRACT

Aspects described herein relate to determining, by a node, to establish a first connection with a first upstream node for receiving downlink communications, and determining, by the node, to establish a second connection with a second upstream node for transmitting uplink communications or establishing a second connection with the same upstream node based on a second transmit/receive beam pair. The first connection can be established with the first upstream node based on a first transmit/receive beam pair. The second connection can be established with the second upstream node (or the same upstream node) based on a second transmit/receive beam pair and concurrently with the first connection is established with the first upstream node.

30 Claims, 6 Drawing Sheets

(51) Int. Cl.

| | | |
|---|---|---|
| *H04B 17/336* | (2015.01) | |
| *H04W 36/00* | (2009.01) | |
| *H04W 72/044* | (2023.01) | |
| *H04W 72/542* | (2023.01) | |
| *H04W 84/04* | (2009.01) | |

(56) References Cited

U.S. PATENT DOCUMENTS

| | | | | |
|---|---|---|---|---|
| 10,841,871 | B2 * | 11/2020 | You | H04W 48/12 |
| 11,206,115 | B2 * | 12/2021 | Qi | H04L 5/0048 |
| 11,496,190 | B2 * | 11/2022 | Gan | H04B 7/0491 |
| 2016/0337916 | A1 * | 11/2016 | Deenoo | H04W 36/0094 |
| 2018/0083679 | A1 * | 3/2018 | Lim | H04B 17/336 |
| 2018/0205533 | A1 * | 7/2018 | Lee | H04B 7/088 |
| 2019/0059099 | A1 | 2/2019 | Davydov et al. | |
| 2019/0140811 | A1 * | 5/2019 | Abedini | H04L 5/1438 |
| 2021/0160861 | A1 * | 5/2021 | You | H04W 28/16 |
| 2022/0132499 | A1 * | 4/2022 | Novlan | H04B 7/15542 |

* cited by examiner

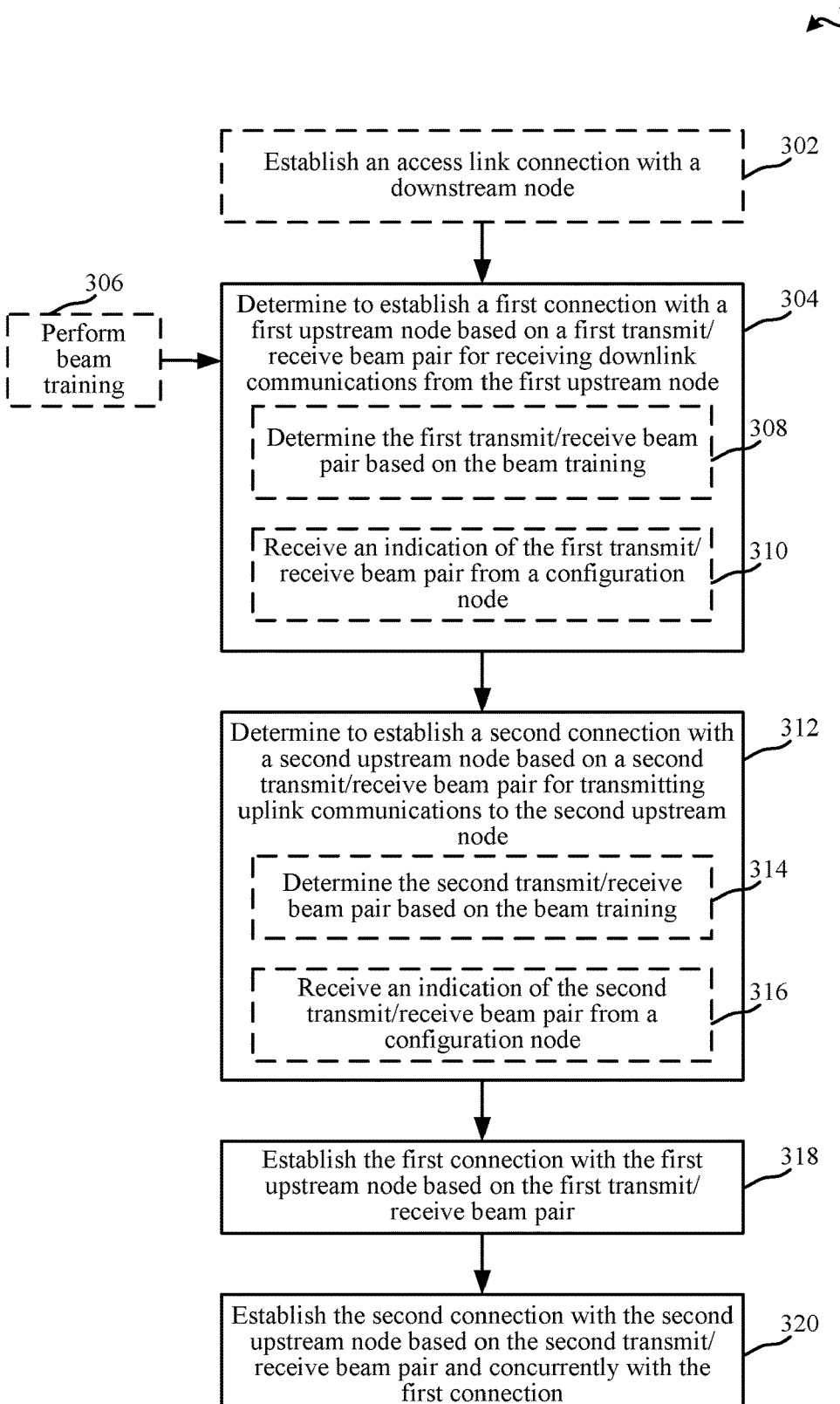

300

302
Establish an access link connection with a downstream node

306
Perform beam training

304
Determine to establish a first connection with a first upstream node based on a first transmit/receive beam pair for receiving downlink communications from the first upstream node 308
Determine the first transmit/receive beam pair based on the beam training 310
Receive an indication of the first transmit/ receive beam pair from a configuration node 312
Determine to establish a second connection with a second upstream node based on a second transmit/receive beam pair for transmitting uplink communications to the second upstream node 314
Determine the second transmit/receive beam pair based on the beam training 316
Receive an indication of the second transmit/receive beam pair from a configuration node 318
Establish the first connection with the first upstream node based on the first transmit/ receive beam pair 320
Establish the second connection with the second upstream node based on the second transmit/ receive beam pair and concurrently with the first connection

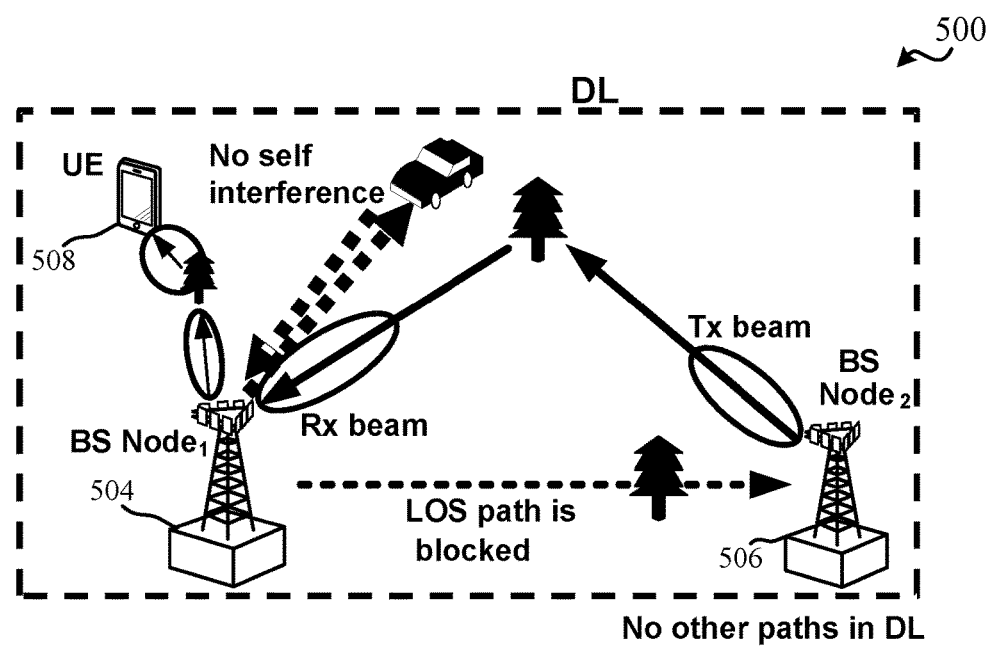
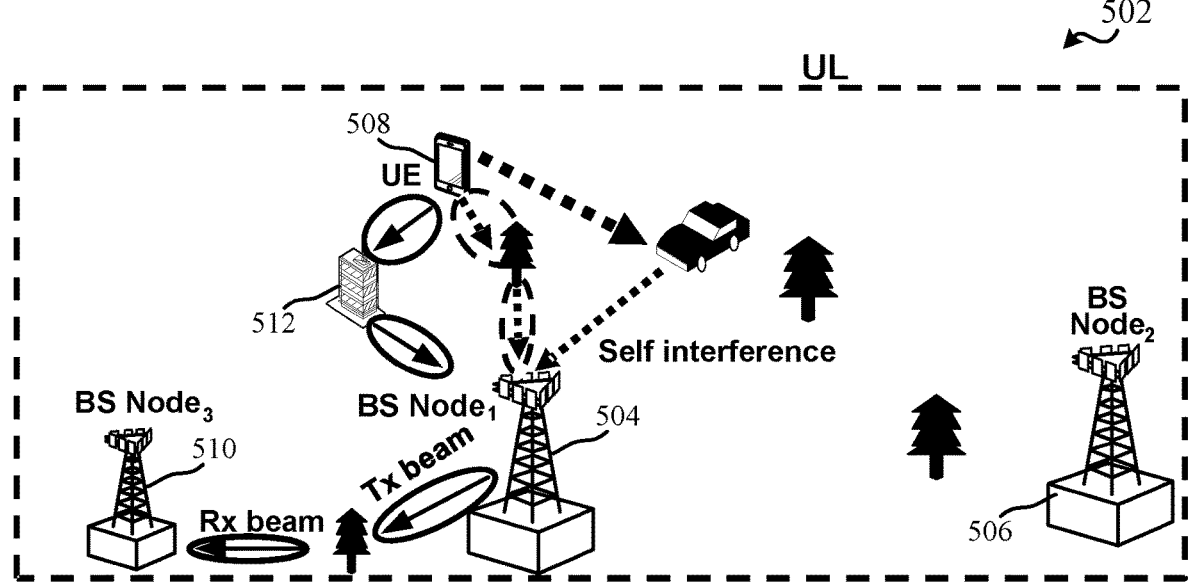
FIG. 5

TECHNIQUES FOR DETERMINING BEAMS FOR FULL DUPLEX WIRELESS COMMUNICATIONS

CLAIM OF PRIORITY UNDER 35 U.S.C. § 119

The present Application for Patent claims priority to Provisional Patent Application No. 62/933,157, entitled "TECHNIQUES FOR DETERMINING BEAMS FOR FULL DUPLEX WIRELESS COMMUNICATIONS" filed Nov. 8, 2019, which is assigned to the assignee hereof and hereby expressly incorporated by reference herein for all purposes.

BACKGROUND

Aspects of the present disclosure relate generally to wireless communication systems, and more particularly, to determining beams to use in full duplex wireless communications.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable low-latency communications (URLLC) with certain specifications for latency and reliability; and massive machine type communications, which can allow a very large number of connected devices and transmission of a relatively low volume of non-delay-sensitive information.

In some wireless communication technologies, an access point and/or other nodes can be configured for full duplex (FD) communications where the access point or other nodes can concurrently transmit and receive over wireless communication resources within the same frequency band or the same component carrier. Access points or other nodes can communicate with one another over one or more backhaul links; however, there can be clutter in a wireless communications path between two access points or other nodes, which can have an impact on signal-to-interference-and-noise ratio (SINR) at one or more of the access points or other nodes. In addition, access points can be integrated access and backhaul (IAB) nodes that can provide access link functionality to a UE (or other IAB node) and corresponding backhaul link functionality with an upstream IAB node or other access point.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method of wireless communication is provided. The method includes determining, by a node, to establish a first connection with a first upstream node for receiving downlink communications, determining, by the node, to establish a second connection with a second upstream node for transmitting uplink communications, establishing the first connection with the first upstream node based on a first transmit/receive beam pair, and establishing the second connection with the second upstream node based on a second transmit/receive beam pair and concurrently with the first connection is established with the first upstream node.

In another example, a method of wireless communication is provided. The method includes determining, by a first node, to establish a first connection with an upstream node for receiving downlink communications based on a first transmit/receive beam pair, determining, by the first node, to establish a second connection with the upstream node for transmitting uplink communications based on a second transmit/receive beam pair different from the first transmit/receive beam pair, establishing the first connection with the upstream node based on the first transmit/receive beam pair, and establishing the second connection with the upstream node based on the second transmit/receive beam pair concurrently with the first connection is established with the upstream node.

In a further example, an apparatus for wireless communication is provided that includes a transceiver, a memory configured to store instructions, and one or more processors communicatively coupled with the transceiver and the memory. The one or more processors are configured to execute the instructions to perform the operations of methods and examples described above and further herein. In another aspect, an apparatus for wireless communication is provided that includes means for performing the operations of methods and examples described above and further herein. In yet another aspect, a computer-readable medium is provided including code executable by one or more processors to perform the operations of methods and examples described above and further herein.

In an example, an apparatus for wireless communication includes a transceiver, a memory configured to store instructions, and one or more processors communicatively coupled with the transceiver and the memory. The one or more processors are configured to determine to establish a first connection with a first upstream node for receiving downlink communications, determine to establish a second connection with a second upstream node for transmitting uplink communications, establish the first connection with the first upstream node based on a first transmit/receive beam pair, and establish the second connection with the second upstream node based on a second transmit/receive beam pair and concurrently with the first connection is established with the first upstream node.

In another example, an apparatus for wireless communication is provided that includes a transceiver, a memory configured to store instructions, and one or more processors communicatively coupled with the transceiver and the memory. The one or more processors are configured to determine to establish a first connection with an upstream node for receiving downlink communications based on a first transmit/receive beam pair, determine to establish a second connection with the upstream node for transmitting uplink communications based on a second transmit/receive beam pair different from the first transmit/receive beam pair, establish the first connection with the upstream node based on the first transmit/receive beam pair, and establish the second connection with the upstream node based on the second transmit/receive beam pair concurrently with the first connection is established with the upstream node.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 3 is a flow chart illustrating an example of a method for determining upstream nodes and transmit/receive beam pairs, in accordance with various aspects of the present disclosure;

FIG. 5 illustrates an example of a node for determining transmit/receive beams in the presence of clutter, in accordance with various aspects of the present disclosure.

DETAILED DESCRIPTION

Figure 1:
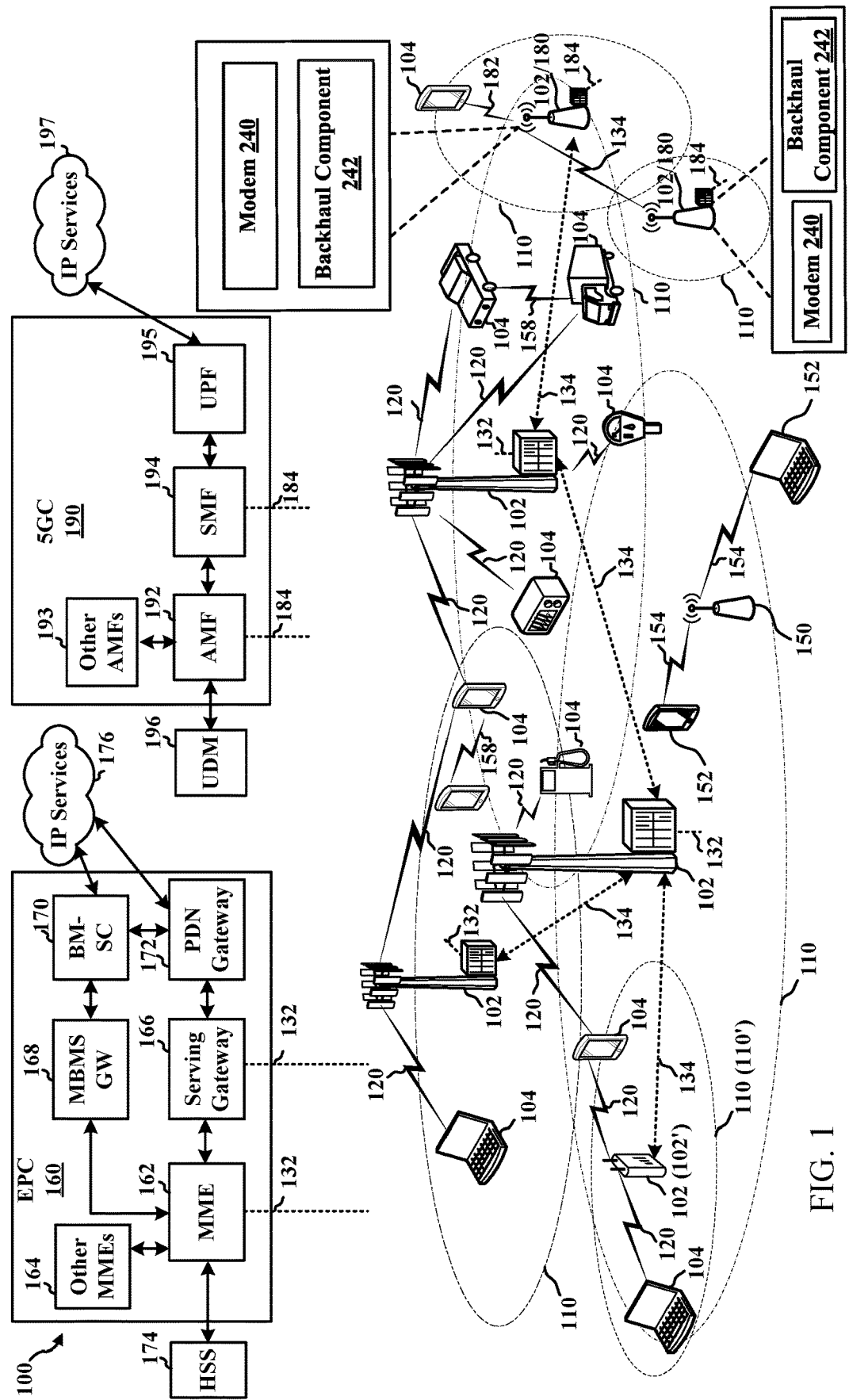
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to determining beams to use in transmitting and/or receiving full duplex (FD) wireless communications. For example, a node can operate to utilize downlink and uplink wireless communications, and may do so concurrently by virtue of FD wireless communications. In addition, in one example, the node can concurrently communicate with different nodes using the downlink and uplink communications. In an example, FD communications at a node can be impacted by clutter caused by objects interfering with wireless signals. For example, an object can cause a transmitted signal to be reflected back to an access point, and in FD communications, the reflected signal can be received and can interfere with other received wireless communications. Said differently, a receive path of a node in FD communications may experience self-interference from clutter that the transmit path may not see (e.g., where the clutter causes the transmitted signal to at least partially reflect to the receiver of the node).

FD communications, as referred to herein, can include a single node (e.g., an access point) transmitting and receiving (e.g., concurrently) over communication resources in the same frequency band and/or over communication resources in the same component carrier (CC). In one example, FD communications can include in-band full duplex (IBFD) where the single node can transmit and receive on the same time and frequency resource, and the downlink and uplink can share the same IBFD time/frequency resources (e.g., full and/or partial overlap). In another example, FD communications can include sub-band FD (also referred to as "flexible duplex") where the single node can transmit and receive at the same time but on different frequency resources within the same frequency band (or over communication resources in the same CC), where the downlink resource and the uplink resources can be separated in the frequency domain (e.g., by a guard band). For example, the guard band in sub-band FD can be on the order of resource block (RB) widths (e.g., 180 kilohertz (kHz) for third generation partnership project (3GPP) long term evolution (LTE) and fifth generation (5G) new radio (NR), 60 and 120 kHz for NR, etc.). This can be distinguished from a guard band in frequency division duplexing (FDD) communications defined in LTE and NR, which can be 5 megahertz (MHz) or more, and the associated resources in FDD are defined between frequency bands, but not within the same frequency band (or resources in the same CC) as is the case in sub-band FD communications.

FD systems can have increased rate and spectral efficiency over half-duplex systems as simultaneous transmit/receive are possible. In addition, enhanced self-interference (and thus decreased signal-to-interference-and-noise ratio (SINR)) from the transmit part of the system on the receive part of the system is possible due to impact of clutter, as described herein. In some examples of FD communications, various antenna configurations can be used within a device (e.g., an access point) to facilitate FD communications. In one configuration, a transmit antenna array can be spatially separated or isolated from a receive antenna array within the device to reduce leakage (e.g., self-interference) from the transmit antenna array into the receive antenna array. The circuitry used to achieve this isolation may be more amenable for backhaul or customer premises equipment (CPE)-type applications. In another example, the antenna array configuration of non-FD communications can use the same antenna array(s) for transmitting or receiving (but not both).

In addition, in an example, a node can communicate with one or more upstream devices and/or one or more different downstream devices. In this example, a node can serve a device (e.g., a user equipment (UE) or other downstream node, such as an integrated access and backhaul (IAB) node) on an access link and can connect with one or more upstream nodes (also referred to as backhaul nodes) over a backhaul link. For a given IAB node, as the upstream and/or downstream node(s) to which the given node connects can be in different locations, there may be asymmetry in terms of local clutter experienced at any given node. For example, clutter may include any object that can act as a reflector, diffractor, scatterer, etc. that redirects signal energy, such as a building, tree, car, etc. In addition, clutter can be static or dynamic and the associated object may be mobile (e.g., moving) or time-varying in terms of induced gains. Clutter around a given node can be dense or sparse and can be dependent on local geometry and/or channel environment. Thus, for example, for a given node, uplink and downlink communications may traverse different paths. For example, a given node may connect to different parent upstream nodes (i.e., backhaul nodes) for downlink and uplink communications to achieve a desirable signal quality, throughput, etc. even when clutter is present.

In another example, a given node can establish beam pairs for communicating with another node, which may include a transmit beam and a receive beam. Generally, a node can create a transmit beam by beamforming antenna resources to transmit a signal in a beamformed direction by directing signal energy of the antenna resources such to achieve a signal transmitted in the beamformed direction. Similarly, a node can create a receive beam by beamforming antenna resources to receive a signal from a beamformed direction by directing the antenna resources to receive a signal in the beamformed direction. A transmit/receive beam pair for a given link can generally be similar to transmit signals to and receive signals from a given device. Where clutter exists, however, transmitting in one direction may at least cause some self-interference at a receiver of the transmitting node in FD communications. Thus, the transmit/receive beams in a beam pair may be different to avoid such self-interference. In one example, where clutter exists for receiving communications from an upstream or downstream node, instead of using a different upstream node (backhaul node), the node may select a different beam pair if possible and use the single upstream node for downlink communications to and uplink communications from a given downstream node.

Aspects described herein relate to determining beams to be used in communicating with various nodes (e.g., upstream and/or downstream nodes) where clutter may be present. The beams may include transmit/receive beam pairs to be used for each given link, and may include using different transmit and receive beams, which can be between different nodes for a given link (e.g., for an IAB node, different backhaul nodes for downlink and uplink communications with a given node over an access link). For example, beam training can be used from a node to neighboring nodes (which may include upstream and downstream nodes) to determine receive beams that may be impacted by self-interference based on clutter, based on which beam pairs to use for each node can be determined. This can include not only determining the beam pairs but also which upstream node(s) to use for each link with a given downstream node. Downlink and uplink communications can be established based on the determined beam pairs and nodes.

In an example, nodes, as referred to herein, can include substantially any type of node capable of FD wireless communications, which may include any class of device defined in third generation partnership project (3GPP), such as a UE, a IAB node, customer premises equipment (CPE), base station or other access point, relay node, repeater (e.g., smart or dumb repeater), etc., which can communicate over an access link, sidelink, etc., as described further herein.

The described features will be presented in more detail below with reference to FIGS. 1-6.

As used in this application, the terms "component," "module," "system" and the like are intended to include a computer-related entity, such as but not limited to hardware, software, a combination of hardware and software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), Institute of Electrical and Electronic Engineers (IEEE) 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and backhaul component 242 for communicating with one another over a wireless or wired backhaul link 134, as described herein. Though a base station 102 is shown as having the modem 240 and backhaul component 242, this is one illustrative example, and substantially any node or type of node may include a modem 240 and backhaul component for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3

GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a Packet Switched (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a positioning system (e.g., satellite, terrestrial), a multimedia device, a video device, a digital audio player (e.g., MP3 player), a camera, a game console, a tablet, a smart device, robots, drones, an industrial/manufacturing device, a wearable device (e.g., a smart watch, smart clothing, smart glasses, virtual reality goggles, a smart wristband, smart jewelry (e.g., a smart ring, a smart bracelet)), a vehicle/a vehicular device, a meter (e.g., parking meter, electric meter, gas meter, water meter, flow meter), a gas pump, a large or small kitchen appliance, a medical/healthcare device, an implant, a sensor/actuator, a display, or any other similar functioning device. Some of the UEs 104 may be referred to as IoT devices (e.g., meters, pumps, monitors, cameras, industrial/manufacturing devices, appliances, vehicles, robots, drones, etc.). IoT UEs may include machine type communication (MTC)/enhanced MTC (eMTC, also referred to as category (CAT-M) or Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, backhaul component 242 can be configured to perform backhaul communications with one or more base stations 102/gNBs 180 using FD. In an example, backhaul component 242 can determine one or more beams to use for the backhaul communications, which can include one or more transmit/receive beam pairs per backhaul connection 134. In an example, a base station 102/gNB 180 can communicate with multiple other base stations 102/gNBs 180 over different backhaul connections 134, and can accordingly determine a transmit/receive beam pair for each backhaul connection 134. For example, a base station 102/gNB 180 can perform beam training with one or more other base stations 102/gNBs 180, or self-training, to determine one or more beams (or one or more transmit/receive beam pairs) to use in communicating with the one or more other base stations 102/gNBs 180, as described further herein.

In one example, a base station 102/gNB 180 can be a IAB node that can communicate with one or more upstream IAB nodes (e.g., other base station(s) 102/gNB(s) 180) over a backhaul connection 134 and one or more downstream IAB nodes (e.g., UE(s) 104 or other base station(s) 102/gNB(s) 180) over an access link (e.g., communication link 120). In this example, for a given downstream node, the base station 102/gNB 180 IAB node, e.g., via backhaul component 242, can establish a first connection with one upstream node for receiving downlink communications to transmit to the downstream node and can establish a second connection with a different upstream node for transmitting uplink communications from the downstream node.

In another example, the base station 102/gNB 180 IAB node, e.g., via backhaul component 242, can establish a first connection with one upstream node for receiving downlink communications to transmit to the downstream node and can establish a second connection with the same upstream node for transmitting uplink communications from the downstream node, where the first and second connections can be based on different transmit/receive beam pairs to mitigate self-interference.

Figure 4:
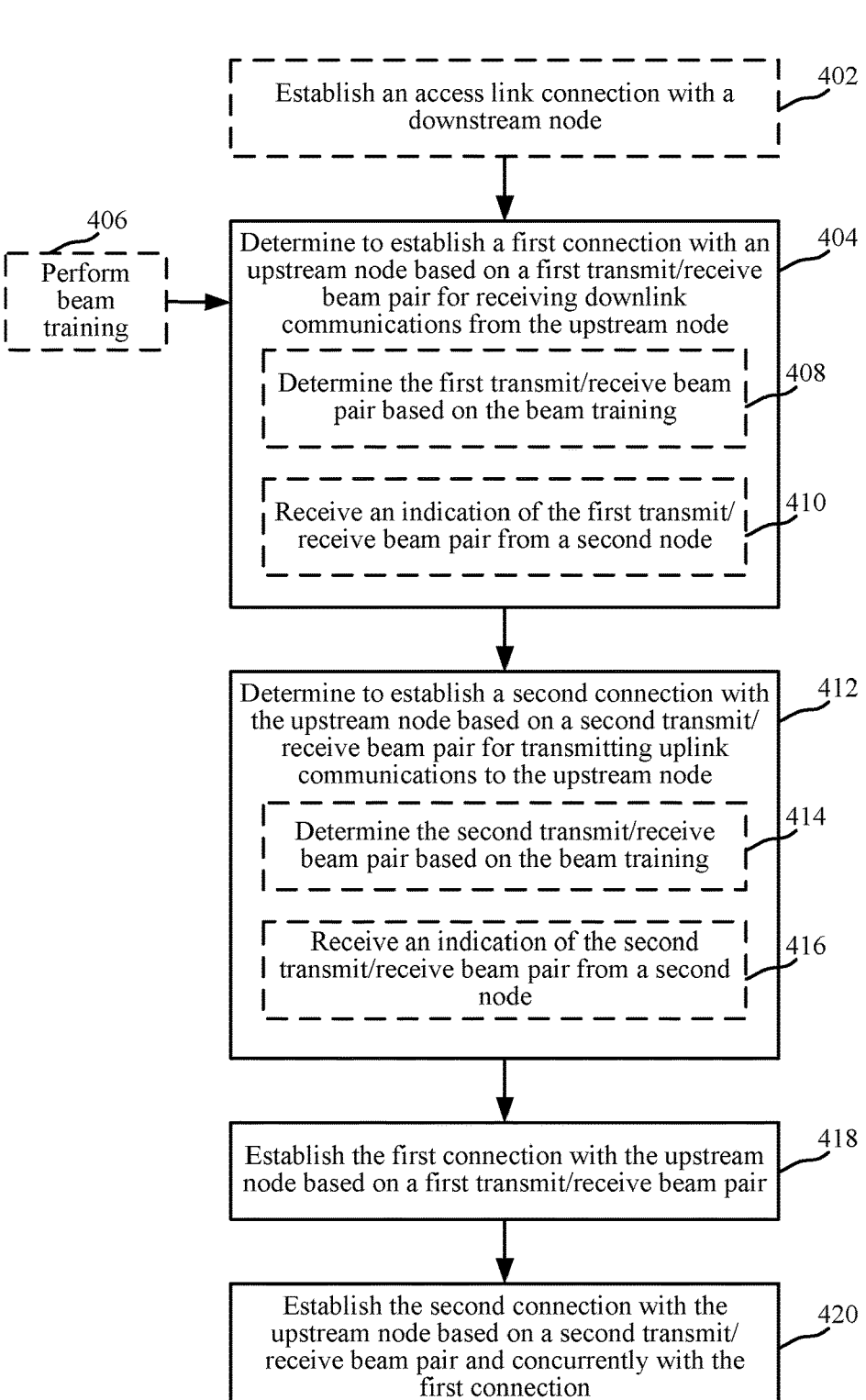
FIG. 4 is a flow chart illustrating an example of a method for determining transmit/receive beam pairs, in accordance with various aspects of the present disclosure.

Turning now to FIGS. 2-6, aspects are depicted with reference to one or more components and one or more methods that may perform the actions or operations described herein, where aspects in dashed line may be optional. Although the operations described below in FIGS. 3-4 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially-programmed software or computer-readable media, or by any other combination of a hardware component and/or a software component capable of performing the described actions or functions.

Figure 2:
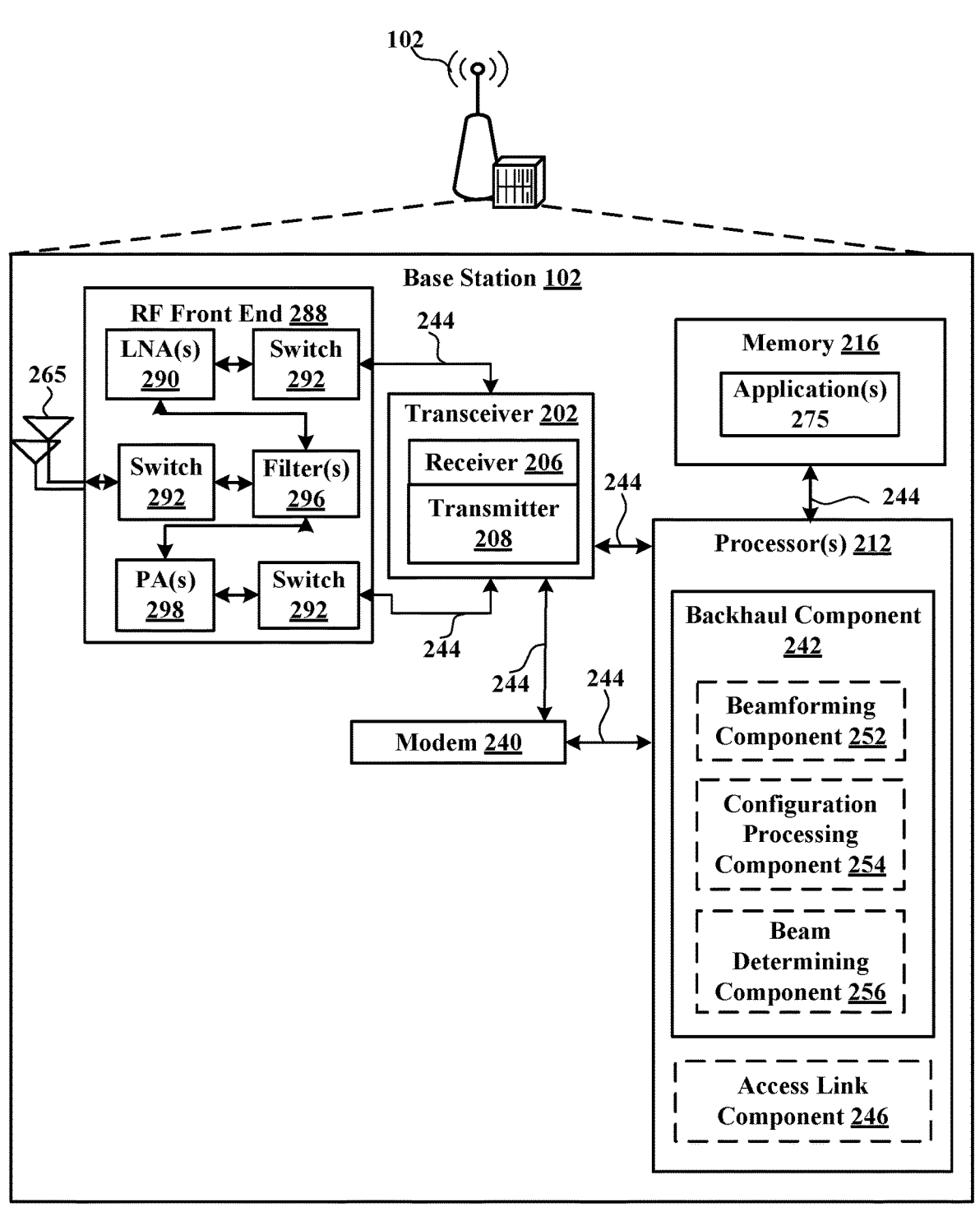
FIG. 2 is a block diagram illustrating an example of a base station, in accordance with various aspects of the present disclosure.

Referring to FIG. 2, one example of an implementation of a base station 102 (and/or gNB 180) may include a variety of components, some of which have already been described above and are described further herein, including components such as one or more processors 212 and memory 216 and transceiver 202 in communication via one or more buses 244, which may operate in conjunction with modem 240 and/or backhaul component 242 for communicating with one or more other base stations 102/gNBs 180 over a backhaul connection 134, determining beams for FD backhaul communications, etc., as described herein, and/or for communicating with one or more other nodes, such as components of the core network (e.g., EPC 160 or 5GC 190, etc.). Base station 102 may also optionally include an access link component 246 for communicating with one or more UEs 104 over an access link (e.g., to provide IAB node functionality).

In an aspect, the one or more processors 212 can include a modem 240 and/or can be part of the modem 240 that uses one or more modem processors. Thus, the various functions related to backhaul component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with backhaul component 242 may be performed by transceiver 202.

Also, memory 216 may be configured to store data used herein and/or local versions of applications 275 or backhaul component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining backhaul component 242 and/or one or more of its subcomponents, and/or data associated therewith, when base station 102 is operating at least one processor 212 to execute backhaul component 242 and/or one or more of its subcomponents.

Transceiver 202 may include at least one receiver 206 and at least one transmitter 208. Receiver 206 may include hardware and/or software executable by a processor for receiving data, the code comprising instructions and being stored in a memory (e.g., computer-readable medium).

Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware and/or software executable by a processor for transmitting data, the code comprising instructions and being stored in a memory (e.g., computer-readable medium). A suitable example of transmitter 208 may including, but is not limited to, an RF transmitter.

Moreover, in an aspect, base station 102 may include RF front end 288, which may operate in communication with one or more antennas 265 and transceiver 202 for receiving and transmitting radio transmissions, for example, wireless communications transmitted by another base station or wireless transmissions transmitted by base station 102. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific (e.g., specific to that filter 296) LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that base station 102 can communicate with, for example, one or more other base stations over a backhaul connection (and/or with one or more UEs over an access link). In an aspect, for example, modem 240 can configure transceiver 202 to operate at a specified frequency and power level based on the configuration of the base station 102 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a given communications protocol. In an aspect, modem 240 can be multimode and be configured to support multiple operating networks and communications protocols. In an aspect, modem 240 can control one or more components of base station 102 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on configuration information associated with base station 102 as provided by the network or other components.

In an aspect, backhaul component 242 can optionally include a beamforming component 252 for generating transmit beams for transmitting communications over a backhaul connection and/or generating receive beams for receiving communications over the backhaul connection, a configuration processing component 254 for receiving and/or processing a configuration received from a centralized entity that indicates transmit/receive beam pairs and/or corresponding upstream nodes with which to establish a connection for backhaul communications, and/or a beam determining component 256 for determining a transmit beam, receive beam, and/or transmit/receive beam pair to use for FD communications over a backhaul connection with one or more upstream nodes, as described herein.

In an aspect, the processor(s) 212 may correspond to one or more of the processors described in connection with the base station(s) in FIG. 6. Similarly, the memory 216 may correspond to the memory described in connection with the base station(s) in FIG. 6.

FIG. 3 illustrates a flow chart of an example of a method 300 for determining nodes with which to establish a connection for backhaul communications and/or transmit and/or receive beam pairs to use for FD backhaul communications with the nodes. In an example, a base station 102 can perform the functions described in method 300 using one or more of the components described in FIGS. 1 and 2.

In method 300, optionally at Block 302, an access link connection can be established with a downstream node. In an aspect, access link component 246, e.g., in conjunction with processor(s) 212, memory 216, transceiver 202, etc., can establish the access link connection with the downstream node. In one example, as described, base station 102 can be an IAB node capable of communicating with upstream nodes and downstream nodes such to facilitate connection between the upstream nodes and downstream nodes. For example, base station 102 can establish a backhaul link with an upstream node (e.g., another base station 102) and an access link with a downstream node (e.g., a UE 104 or another base station 102 IAB node). In this example, base station 102 can forward, over the access link, communications received from the upstream node, on the backhaul link, to the downstream node and can forward, over the backhaul link, communications received from the downstream node, on the access link, to the upstream node. In an example, access link component 246 can establish the access link with the downstream node based on a request from the downstream node (e.g., a request from a UE 104, a request from a UE 104 forwarded from a downstream IAB node, etc.). In one example, as described further herein, base station 102 can determine to establish connections with different upstream nodes for receiving downlink communications for the downstream node and for transmitting uplink communications from the downstream node to mitigate interference or self-interference that may be caused by clutter.

In addition, for example, access link component 246 can establish the access link connections using an access node function or functionality (AN-F) of the IAB node, which can establish an access link connection using similar functions as a base station 102 (e.g., gNB, etc., providing signaling and/or resources for allowing the one or more downstream nodes to random access procedure, etc.). For example, the functions for establishing the access link connection can be defined in a radio access technology (RAT) used by the IAB node and/or base stations 102 for communicating with one or more base stations 102, such as 5G NR for gNB.

In method 300, at Block 304, it can be determined to establish a first connection with a first upstream node based on a first transmit/receive beam pair for receiving downlink communications from the first upstream node. In an aspect, beam determining component 256, e.g., in conjunction with processor(s) 212, memory 216, transceiver 202, backhaul component 242, etc., can determine to establish the first connection with the first upstream node based on the first transmit/receive beam pair for receiving downlink communications from the first upstream node. For example, beam determining component 256 can determine to establish the first connection based at least in part on establishing the access link connection. In this example, beam determining component 256 can determine the first upstream node to use for receiving downlink communications intended for the downstream node (or one or more other downstream nodes connected to the downstream nodes). Moreover, the first connection can include a backhaul connection to the first upstream node.

In one example, beam determining component 256 can determine to establish the first connection with the first upstream node based on a signal quality, strength, (e.g., signal-to-noise ratio (SNR), signal-to-interference-and-noise ratio (SINR), received signal strength indicator (RSSI), reference signal received power (RSRP), reference signal received quality (RSRQ), etc.) or other property of signals received from the first upstream node. For example, beam determining component 256 can measure signals received from various upstream nodes and can compare the signals to determine the first upstream node with which to establish the first connection. This may include comparing beams received from the various upstream nodes, as described further herein.

For example, in method 300, optionally at Block 306, beam training can be performed. In an aspect, beam determining component 256, e.g., in conjunction with processor(s) 212, memory 216, transceiver 202, backhaul component 242, etc., can perform beam training with various upstream nodes to determine transmit/receive beam pairs used to communicate with one or more of the various upstream nodes. For example, in beam training, for a number of nodes (e.g., base stations 102 and/or UEs 104) that are capable of FD backhaul communications (referred to as "FD nodes" or "nodes" herein) in the network, let the transmit part of each FD node use N beams and let the receive part of each FD node use M beams. In this example, beam determining component 256 can perform a beam training operation from each transmit part sequentially by transmitting each of the N beams while all receive parts (including the receive part of the base station 102 transmitting and other nodes) receive the beams using each of the M receive beams. This process can be repeated by transmit parts for each FD node until all FD nodes have transmitted beams, which were received by all receive parts of the other FD nodes (and the receive parts of the transmitting FD node itself). In an example, beam determining component 256 can provide beam reports indicating signal measurements of one or more beams to a centralized entity for beam pair determination, as described herein.

In this example, in determining to establish the first connection at Block 304, optionally at Block 308, the first transmit/receive beam pair can be determined based on the beam training. In an aspect, beam determining component 256, e.g., in conjunction with processor(s) 212, memory 216, transceiver 202, backhaul component 242, etc., can determine the first transmit/receive beam pair based on the beam training. As described, for example, this may include beam determining component 256 first determining to establish the first connection with the first upstream node based at least in part on signal properties of signals received from the first upstream node. In addition, this can include beam determining component 256 determining the first transmit/receive beam pair to use with the first upstream node based on an indication of a beam pair received from the first upstream node, determining desirable beam pairs that are not subject to self-interference from clutter (e.g., based on SINR, SNR, or other signal measurements, which can be determined as part of beam training, etc.) and selecting or otherwise requesting to use such beam pairs, etc.

In another example, in determining to establish the first connection at Block 304, optionally at Block 310, an indication of the first transmit/receive beam pair can be received from a configuration node. In an aspect, beam determining component 256, e.g., in conjunction with processor(s) 212, memory 216, transceiver 202, backhaul component 242, etc., can receive the indication of the first transmit/receive beam pair from the configuration node. For example, the configuration node may include a node of a wireless network that may be part of a EPC 160, 5GC 190, or other centralized entity that can communicate with various nodes (e.g., various IAB nodes, which may include one or more base stations 102, etc.). In an example, beam determining component 256 can send one or more beam reports to a centralized entity (e.g., as part of the beam training) and can receive the indication, or one or more commands related to the indication, of the beam to use based on providing the beam report or other results of beam training to the configuration node. In one example, the configuration node can select, for the base station 102, the first upstream node and/or the transmit/receive beam pair to use in communicating therewith, and may do so for other base stations as well.

In method 300, at Block 312, it can be determined to establish a second connection with a second upstream node based on a second transmit/receive beam pair for transmitting uplink communications to the second upstream node. In an aspect, beam determining component 256, e.g., in conjunction with processor(s) 212, memory 216, transceiver 202, backhaul component 242, etc., can determine to establish the second connection with the second upstream node based on the second transmit/receive beam pair for transmitting uplink communications to the second upstream node. For example, beam determining component 256 can determine to establish the second connection based at least in part on establishing the access link connection. In this example, beam determining component 256 can determine the second upstream node to use for transmitting uplink communications received from the downstream node (or one or more other downstream nodes connected to the downstream nodes). Moreover, the second connection can include a backhaul connection to the second upstream node.

In one example, beam determining component 256 can determine to establish the second connection with the second upstream node based on a signal quality or strength (e.g., signal-to-noise ratio (SNR), signal-to-interference-and-noise ratio (SINR), received signal strength indicator (RSSI), reference signal received power (RSRP), reference signal received quality (RSRQ), etc.) or other property of signals received from the second upstream node. For example, beam determining component 256 can measure signals received from various upstream nodes and can compare the signals to determine the second upstream node with which to establish the second connection. This may include comparing beams received from the various upstream nodes, as described above. Moreover, beam determining component 256 may determine to select the second upstream node for transmitting uplink communications thereto to be different from the first upstream node in the presence of clutter.

FIG. 5 illustrates an example of a base station establishing connections with different upstream nodes for downlink and uplink communications for a given downstream node. In FIG. 5, downlink communication are shown at 500, where the BS Node 1 504 (e.g., a base station 102) can establish a connection with BS Node 2 506 (an upstream node), over a backhaul connection, for receiving downlink communications for a UE 508. In this example, a line-of-site (LOS) path between the BS Node 1 504 and BS Node 2 506 may be blocked by clutter (e.g., a tree), and a transmit beam transmitted by the BS Node 2 506 may be received by the BS Node 1 504 by being reflected off of additional clutter (e.g., another tree). In this regard, beam determining component 256 of BS Node 1 504 may determine to use BS Node 2 506 to receive downlink communications (by detecting the reflected transmit beam and/or determining that the reflected transmit beam is received at least at a threshold signal strength or quality). In addition, beam determining component 256 of BS Node 1 504 may determine a beam to use to transmit the downlink communications, received from BS Node 2 506 and intended for UE 508, to UE 508. In an example, the beam used to transmit the communications to the UE 508 may also reflect off of clutter in the depicted example.

In the depicted example, however, BS Node 1 504 may not be able to transmit uplink communications back to BS Node 2 506 (due to the LOS path blockage and no transmit beam that can be received by the BS Node 2 506), and thus beam reciprocity/correspondence typically used in determining beams may not result in a desirable or usable beam (and thus that the impact of clutter is asymmetrical between upstream nodes). Accordingly, as described herein, beam determining component 256 can select a different path for transmitting uplink communications from the downstream node, as shown at 502. In this example, BS Node 1 504 can determine to communicate with BS Node 3 510 to transmit uplink communications from the UE 508. In this regard, BS Node 2 506 and BS Node 3 510 (and BS Node 1 504) can connect to, or otherwise be able to access, the same core wireless network to provide uplink communications from the UE 508 to the network and/or receive downlink communications for the UE 508 from the network.

In addition, beam determining component 256 of BS Node 1 504 (and/or a component of the UE 508) may determine a different beam to use to receive uplink communications from the UE 508 for transmitting over the different path for uplink communications to BS Node 2 506. This may be based on determining that a reciprocal or corresponding beam to the beam used in transmitting downlink communications to the UE 508 may not be useable based on clutter (and thus that the impact of clutter is asymmetrical for the uplink and downlink connections with the downstream node). In the depicted example, the reciprocal beam for the beam for transmitting downlink communications to the UE 508 in DL 500 may cause self-interference based on additional clutter (the car) reflecting the beam into the BS Node 1 504. Thus, beam determining component 256 of BS Node 1 504 (or a component of the UE 508) can determine to use another beam to receive/transmit uplink communications to BS Node 1 504, which can be the beam reflecting from building 512.

In an example, beam determining component 256 can determine the different beams to avoid clutter based on performing beam training, as described above, where beams that are subject to interference or cause self-interference from clutter may be identified based on undesirable signal properties (e.g., based on determining signal strength or quality measurements, such as SINR/SNR, as being below a threshold, etc.).

In an example, in determining to establish the second connection at Block 312, optionally at Block 314, the second transmit/receive beam pair can be determined based on the beam training. In an aspect, beam determining component 256, e.g., in conjunction with processor(s) 212, memory 216, transceiver 202, backhaul component 242, etc., can determine the second transmit/receive beam pair based on the beam training. As described, for example, this may include beam determining component 256 first determining to establish the second connection with the second upstream node based at least in part on signal properties of signals received from the second upstream node. In addition, this can include beam determining component 256 determining the second transmit/receive beam pair to use with the second upstream node based on an indication of a beam pair received from the second upstream node, determining desirable beam pairs that are not subject to self-interference from clutter (e.g., based on SINR, SNR, or other signal measurements, etc.) and selecting or otherwise requesting to use such beam pairs, etc.

In another example, in determining to establish the second connection at Block 304, optionally at Block 316, an indication of the second transmit/receive beam pair can be received from a configuration node. In an aspect, beam determining component 256, e.g., in conjunction with processor(s) 212, memory 216, transceiver 202, backhaul component 242, etc., can receive the indication of the second transmit/receive beam pair from the configuration node. For example, the configuration node may include a node of a wireless network that may be part of a EPC 160, 5GC 190, or other centralized entity that can communicate with various nodes (e.g., various IAB nodes, which may include one or more base stations 102, etc.). In an example, beam determining component 256 can send one or more beam reports to a centralized entity (e.g., as part of the beam training) and can receive the indication, or one or more commands related to the indication, of the beam to use, based on providing the beam report or other results of beam training to the configuration node. In one example, the configuration node can select, for the base station 102, the second upstream node and/or the transmit/receive beam pair to use in communicating therewith, and may do so for other base stations as well.

In any case, for example, determination of DL and UL beams (and/or the nodes with which the DL or UL beams are established) can be made by a base station 102 (e.g., BS Node 1 504) via beam training to other nodes in the vicinity of itself. Alternately, DL and UL beams (and/or the nodes with which the DL or UL beams are established) can be determined by a central processing node/entity that schedules beam training, collects beam training measurement reports and determines DL and UL beams for connections at one or more (e.g., all, or a set of multiple) nodes in the network. In an example, as described, base station 102 can perform beam training to all its neighbor nodes (including UEs and IAB/BS nodes) to determine Rx beams that suffer from self-interference due to local clutter in environment. Rx beams that suffer from a threshold amount of interference/self-interference can be avoided. In addition, for example, the base station 102 can determine correct and/or viable beam pairs to use for each UE (e.g., or other downstream node) and the correct and/or viable IAB/BS node (e.g., or other upstream node) to connect to for that UE for DL and UL. As described, for example, beam determining component 256, backhaul component 252, or another component of the base station 102 can determine the beam pairs or upstream nodes to be avoided based on received signal strength or quality measurements being below a threshold and/or can determine the viable beam pairs or upstream nodes based on received signal strength or quality measurements achieving a threshold. For example, beam determining component 256 can determine to establish the first connection and/or the second connection based on comparing a first signal quality of the first beam to a first threshold, and/or comparing a second signal quality of the second beam to a second threshold.

In method 300, at Block 318, the first connection can be established with the first upstream node based on the first transmit/receive beam pair. In an aspect, backhaul component 242, e.g., in conjunction with processor(s) 212, memory 216, transceiver 202, etc., can establish the first connection with the first upstream node based on the first transmit/receive beam pair. In one example, this can include beamforming component 252 beamforming antenna resources to transmit to the first upstream node based on the first transmit/receive beam pair, beamforming antenna resources to receive signals from the first upstream node based on the first transmit/receive beam pair, etc. For example, beamforming component 252 can beamform antenna resources to receive, from the first upstream node, downlink communications for the downstream node, which the access link component 246 can transmit over a downlink connection to the downstream node. In addition, for example, backhaul component 242 can establish the first connection as a backhaul link connection with the first upstream node using a UE function or functionality (UE-F) of the IAB node, which can establish a backhaul link connection using similar functions as a UE 104 (e.g., based on performing a random access procedure based on discovering the upstream node(s), etc.). For example, the functions for establishing the backhaul link connection can be defined in a radio access technology (RAT) used by the IAB node and/or UEs 104 for communicating with one or more base stations 102, such as 5G NR.

In method 300, at Block 320, the second connection can be established with the second upstream node based on the second transmit/receive beam pair and concurrently with the first connection. In an aspect, backhaul component 242, e.g., in conjunction with processor(s) 212, memory 216, transceiver 202, etc., can establish the second connection with the second upstream node based on the first transmit/receive beam pair and concurrently (e.g., simultaneously) with the first connection. Moreover, for example, backhaul component 242 can establish the second connection as a backhaul link connection with the second upstream node using a UE function or functionality (UE-F) of the IAB node. In addition, for example, backhaul component 242 can communicate with both the first upstream node and the second upstream node for downlink and uplink communications, respectively, for a given downstream node. In one example, this can include beamforming component 252 beamforming antenna resources to transmit to the second upstream node based on the second transmit/receive beam pair, beamforming antenna resources to receive signals from the second upstream node based on the second transmit/receive beam pair, etc. For example, beamforming component 252 can beamform antenna resources to transmit, to the second upstream node, uplink communications received from the downstream node, where the access link component 246 can have received the uplink communications over an uplink connection to the downstream node.

FIG. 4 illustrates a flow chart of an example of a method 400 for determining transmit/receive beam pairs to use in establishing a connection for backhaul communications with an upstream node. In an example, a base station 102 can perform the functions described in method 400 using one or more of the components described in FIGS. 1 and 2.

In method 400, optionally at Block 402, an access link connection can be established with a downstream node. In an aspect, access link component 246, e.g., in conjunction with processor(s) 212, memory 216, transceiver 202, etc., can establish the access link connection with the downstream node, as described above in reference to Block 302 of method 300 (FIG. 3).

In method 400, at Block 404, it can be determined to establish a first connection with an upstream node based on a first transmit/receive beam pair for receiving downlink communications from the upstream node. In an aspect, beam determining component 256, e.g., in conjunction with processor(s) 212, memory 216, transceiver 202, backhaul component 242, etc., can determine to establish the first connection with the upstream node based on the first transmit/receive beam pair for receiving downlink communications from the upstream node, which can be similar to determining to establish the first connection in reference to Block 304 of method 300 (FIG. 3). For example, beam determining component 256 can determine to establish the first connection based at least in part on establishing the access link connection. In this example, beam determining component 256 can determine the upstream node to use for receiving downlink communications intended for the downstream node (or one or more other downstream nodes connected to the downstream nodes), which can be based on comparing signal metrics, as described above. Moreover, the first connection can include a backhaul connection to the upstream node.

For example, in method 400, optionally at Block 406, beam training can be performed. In an aspect, beam determining component 256, e.g., in conjunction with processor(s) 212, memory 216, transceiver 202, backhaul component 242, etc., can perform beam training with various upstream nodes to determine transmit/receive beam pairs used to communicate with one or more of the various upstream nodes, as described above in reference to Block 306 of method 300 (FIG. 3).

In this example, in determining to establish the first connection at Block 404, optionally at Block 408, the first transmit/receive beam pair can be determined based on the beam training. In an aspect, beam determining component 256, e.g., in conjunction with processor(s) 212, memory 216, transceiver 202, backhaul component 242, etc., can determine the first transmit/receive beam pair based on the beam training, as described above in reference to Block 308 of method 300 (FIG. 3).

In another example, in determining to establish the first connection at Block 404, optionally at Block 410, an indication of the first transmit/receive beam pair can be received from a configuration node. In an aspect, beam determining component 256, e.g., in conjunction with processor(s) 212, memory 216, transceiver 202, backhaul component 242, etc., can receive the indication of the first transmit/receive beam pair from the configuration node, as described above in reference to Block 310 of method 300 (FIG. 3).

In method 400, at Block 412, it can be determined to establish a second connection with the upstream node based on a second transmit/receive beam pair for transmitting uplink communications to the upstream node. In an aspect, beam determining component 256, e.g., in conjunction with processor(s) 212, memory 216, transceiver 202, backhaul component 242, etc., can determine to establish the second connection with the upstream node based on the second transmit/receive beam pair for transmitting uplink communications to the upstream node. For example, beam determining component 256 can determine to establish the second connection based at least in part on establishing the access link connection, as described above in reference to Block 312 of method 300 (FIG. 3), but can do so by determining to establish the second connection with the same upstream node as the first connection, where a different transmit/receive beam pair can provide desirable/viable connection (e.g., where measured signal metrics for the different transmit/receive beam pair with the same upstream node are determined to be desirable), though the first transmit/receive beam pair with the same upstream node may be determined to not provide desirable/viable connection for transmitting uplink communications. Moreover, the second connection can include a backhaul connection to the upstream node.

In an example, in determining to establish the second connection at Block 412, optionally at Block 414, the second transmit/receive beam pair can be determined based on the beam training. In an aspect, beam determining component 256, e.g., in conjunction with processor(s) 212, memory 216, transceiver 202, backhaul component 242, etc., can determine the second transmit/receive beam pair based on the beam training, as described above in reference to Block 314 of method 300 (FIG. 3). As described, for example, this may include beam determining component 256 first determining to establish the second connection with the same upstream node based at least in part on signal properties of signals received from the second upstream node. In addition, this can include beam determining component 256 determining the second transmit/receive beam pair to use with the second upstream node based on an indication of a beam pair received from the second upstream node, determining desirable beam pairs that are not subject to self-interference from clutter for transmitting uplink communications (e.g., based on SINR, SNR, or other signal measurements, etc.) and selecting or otherwise requesting to use such beam pairs, etc.

In another example, in determining to establish the second connection at Block 404, optionally at Block 416, an indication of the second transmit/receive beam pair can be received from a configuration node. In an aspect, beam determining component 256, e.g., in conjunction with processor(s) 212, memory 216, transceiver 202, backhaul component 242, etc., can receive the indication of the second transmit/receive beam pair from the configuration node, as described above in reference to Block 316 of method 300 (FIG. 3).

In any case, for example, determination of DL and UL can be made by a base station 102 (e.g., BS Node 1 504) via beam training to other nodes in the vicinity of itself. Alternately, DL and UL can be determined by a central processing node/entity that schedules beam training, collects beam training measurement reports and determines DL and UL connections at every node in the network. In an example, as described, base station 102 can perform beam training to all its neighbor nodes (including UEs and IAB/BS nodes) to determine Rx beams that suffer from self-interference due to local clutter in environment. Rx beams that suffer from a threshold amount of interference/self-interference can be avoided. In addition, for example, the base station 102 can determine correct and/or viable beam pairs to use for each UE (e.g., or other downstream node) and the correct and/or viable IAB/BS node (e.g., or other upstream node) to connect to for that UE for DL and UL, where for a given UE, the base station 102 can determine to use different transmit/receive beam pairs for DL and UL with the same upstream IAB/BS node.

In method 400, at Block 418, the first connection can be established with the upstream node based on the first transmit/receive beam pair. In an aspect, backhaul component 242, e.g., in conjunction with processor(s) 212, memory 216, transceiver 202, etc., can establish the first connection with the upstream node based on the first transmit/receive beam pair. In one example, this can include beamforming component 252 beamforming antenna resources to transmit to the upstream node based on the first transmit/receive beam pair, beamforming antenna resources to receive signals from the upstream node based on the first transmit/receive beam pair, etc. For example, beamforming component 252 can beamform antenna resources to receive, from the upstream node, downlink communications for the downstream node, which the access link component 246 can transmit over a downlink connection to the downstream node. In addition, for example, backhaul component 242 can establish the first connection as a backhaul link connection with the upstream node using a UE-F of the IAB node, which can establish a backhaul link connection using similar functions as a UE 104 (e.g., based on performing a random access procedure based on discovering the upstream node(s), etc.). For example, the functions for establishing the backhaul link connection can be defined in a RAT used by the IAB node and/or UEs 104 for communicating with one or more base stations 102, such as 5G NR In method 400, at Block 420, the second connection can be established with the upstream node based on the second transmit/receive beam pair and concurrently with the first connection. In an aspect, backhaul component 242, e.g., in conjunction with processor(s) 212, memory 216, transceiver 202, etc., can establish the second connection with the upstream node based on the first transmit/receive beam pair and concurrently (e.g., simultaneously) with the first connection. Moreover, for example, backhaul component 242 can establish the second connection as a backhaul link connection with the upstream node using a UE function or functionality (UE-F) of the IAB node. In addition, for example, backhaul component 242 can communicate with the upstream node for downlink and uplink communications, respectively, for a given downstream node. In one example, this can include beamforming component 252 beamforming antenna resources to transmit to the upstream node based on the second transmit/receive beam pair, beamforming antenna resources to receive signals from the upstream node based on the second transmit/receive beam pair, etc. For example, beamforming component 252 can beamform antenna resources to transmit, to the upstream node, uplink communications received from the downstream node, where the access link component 246 can have received the uplink communications over an uplink connection to the downstream node.

Figure 6:
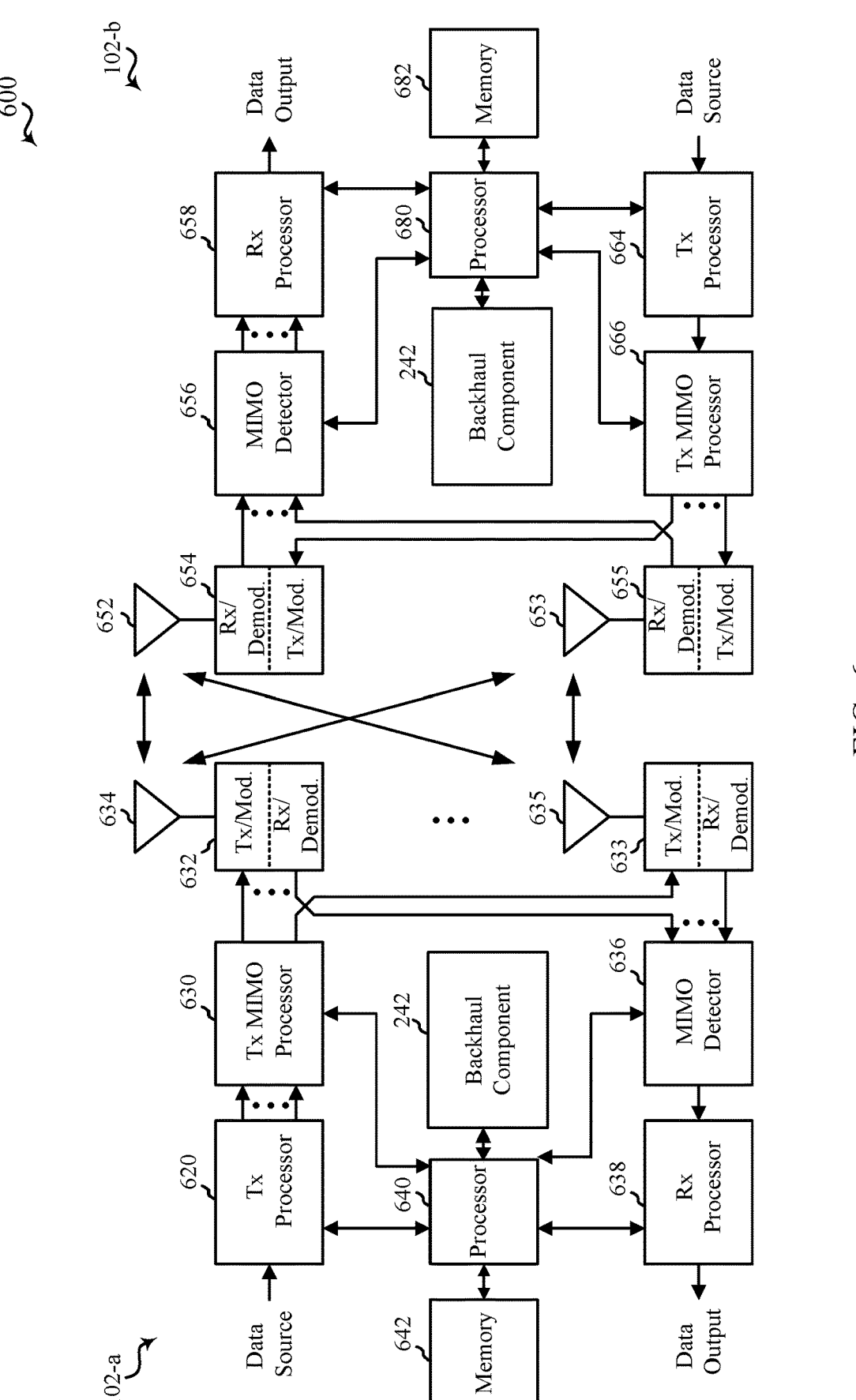
FIG. 6 is a block diagram illustrating an example of a MIMO communication system including base stations in backhaul communications, in accordance with various aspects of the present disclosure.

FIG. 6 is a block diagram of a MIMO communication system 600 including base stations 102-*a* and 102-*b* that can communicate over a wireless backhaul, in accordance with various aspects of the present disclosure. The MIMO communication system 600 may illustrate aspects of the wireless communication access network 100 described with reference to FIG. 1. The base stations 102-*a*, 102-*b* may be an example of aspects of the base station 102 described with reference to FIG. 1. The base station 102-*a* may be equipped with antennas 634 and 635, and the base station 102-*b* may be equipped with antennas 652 and 653. In the MIMO communication system 600, the base station 102-*a* may be able to send data over multiple communication links at the same time. Each communication link may be called a "layer" and the "rank" of the communication link may indicate the number of layers used for communication. For example, in a 2×2 MIMO communication system where base station 102-*a* transmits two "layers," the rank of the backhaul link between the base station 102-*a* and the base station 102-*b* is two.

At the base station 102-*a*, a transmit (Tx) processor 620 may receive data from a data source. The transmit processor 620 may process the data. The transmit processor 620 may also generate control symbols or reference symbols. A transmit MIMO processor 630 may perform spatial processing (e.g., precoding) on data symbols, control symbols, or reference symbols, if applicable, and may provide output symbol streams to the transmit modulator/demodulators 632 and 633. Each modulator/demodulator 632 through 633 may process a respective output symbol stream (e.g., for OFDM, etc.) to obtain an output sample stream. Each modulator/demodulator 632 through 633 may further process (e.g., convert to analog, amplify, filter, and upconvert) the output sample stream to obtain a DL signal. In one example, DL signals from modulator/demodulators 632 and 633 may be transmitted via the antennas 634 and 635, respectively.

The base station 102-*b* may be an example of aspects of the base station 102 (or other upstream nodes) described with reference to FIGS. 1-2. At the base station 102-*b*, the antennas 652 and 653 may receive the DL signals from the base station 102-*a* and may provide the received signals to the modulator/demodulators 654 and 655, respectively. Each modulator/demodulator 654 through 655 may condition (e.g., filter, amplify, downconvert, and digitize) a respective received signal to obtain input samples. Each modulator/demodulator 654 through 655 may further process the input samples (e.g., for OFDM, etc.) to obtain received symbols. A MIMO detector 656 may obtain received symbols from the modulator/demodulators 654 and 655, perform MIMO detection on the received symbols, if applicable, and provide detected symbols. A receive (Rx) processor 658 may process (e.g., demodulate, deinterleave, and decode) the detected symbols, providing decoded data for the UE 104 to a data output, and provide decoded control information to a processor 680, or memory 682.

The processor 680 may in some cases execute stored instructions to instantiate a backhaul component 242 (see e.g., FIGS. 1 and 2).

On the uplink (UL), at the base station 102-*b*, a transmit processor 664 may receive and process data from a data source. The transmit processor 664 may also generate reference symbols for a reference signal. The symbols from the transmit processor 664 may be precoded by a transmit MIMO processor 666 if applicable, further processed by the modulator/demodulators 654 and 655 (e.g., for SC-FDMA, etc.), and be transmitted to the base station 102-*a* in accordance with the communication parameters received from the base station 102-*a*. At the base station 102-*a*, the UL signals from the base station 102-*b* may be received by the antennas 634 and 635, processed by the modulator/demodulators 632 and 633, detected by a MIMO detector 636 if applicable, and further processed by a receive processor 638. The receive processor 638 may provide decoded data to a data output and to the processor 640 or memory 642.

The processor 640 may in some cases execute stored instructions to instantiate a backhaul component 242 (see e.g., FIGS. 1 and 2).

The components of the base station 102-*b* may, individually or collectively, be implemented with one or more application-specific integrated circuits (ASICs) adapted to perform some or all of the applicable functions in hardware. Each of the noted modules may be a means for performing one or more functions related to operation of the MIMO communication system 600. Similarly, the components of the base station 102-*a* may, individually or collectively, be implemented with one or more ASICs adapted to perform some or all of the applicable functions in hardware. Each of the noted components may be a means for performing one or more functions related to operation of the MIMO communication system 600.

In addition, the base station 102-*a* and/or 102-*b* may communicate with downstream nodes, which may include one or more UEs 104 or other base stations, using similar mechanisms as described for base station 102-*a* and base station 102-*b*, respectively (e.g., where the downstream node can use components and functions described above with respect to base station 102-*b*, and base station 102-*a* or base station 102-*b* as an upstream node can use components and functions described above with respect to base station 102-*a*).

The following aspects are illustrative only and aspects thereof may be combined with aspects of other embodiments or teaching described herein, without limitation.

Aspect 1 is a method of wireless communication including determining, by a node, to establish a first connection with a first upstream node for receiving downlink communications, determining, by the node, to establish a second connection with a second upstream node for transmitting uplink communications;

establishing the first connection with the first upstream node based on a first transmit/receive beam pair, and establishing the second connection with the second upstream node based on a second transmit/receive beam pair and concurrently with the first connection is established with the first upstream node.

In Aspect 2, the method of Aspect 1 includes wherein determining to establish the first connection is based on performing beam training and determining that a first beam from the first upstream node is desirable for downlink communications.

In Aspect 3, the method of Aspect 2 includes wherein determining to establish the second connection is based on performing the beam training and determining that a second beam from the second upstream node is desirable for uplink communications.

In Aspect 4, the method of Aspect 3 includes wherein determining to establish the first connection and determining to establish the second connection is based on comparing a first signal quality of the first beam to a first threshold, and comparing a second signal quality of the second beam to a second threshold.

In Aspect 5, the method of Aspect 4 includes wherein the first signal quality and the second signal quality correspond to at least one of a signal-to-noise ratio (SNR) or a signal-to-interference-and-noise ratio (SINR).

In Aspect 6, the method of any of Aspects 1 to 5 include performing beam training and sending one or more beam reports to a centralized entity, wherein determining to establish the first connection and determining to establish the second connection are based on one or more commands received from the centralized entity based on the one or more beam reports.

Aspect 7 is a method of wireless communication including determining, by a first node, to establish a first connection with an upstream node for receiving downlink communications based on a first transmit/receive beam pair, determining, by the first node, to establish a second connection with the upstream node for transmitting uplink communications based on a second transmit/receive beam pair different from the first transmit/receive beam pair, establishing the first connection with the upstream node based on the first transmit/receive beam pair, and establishing the second connection with the upstream node based on the second transmit/receive beam pair concurrently with the first connection is established with the upstream node.

In Aspect 8, the method of Aspect 7 includes wherein determining to establish the first connection is based on performing beam training and determining that a first beam from the upstream node is desirable for downlink communications and determining that a second beam from the upstream node is desirable for uplink communications.

In Aspect 9, the method of Aspect 8 includes wherein determining to establish the first connection and determining to establish the second connection is based on comparing a first signal quality of the first beam to a first threshold, and comparing a second signal quality of the second beam to a second threshold.

In Aspect 10, the method of Aspect 9 includes wherein the first signal quality and the second signal quality correspond to at least one of a signal-to-noise ratio (SNR) or a signal-to-interference-and-noise ratio (SINR).

In Aspect 11, the method of any of Aspects 7 to 10 include performing beam training and sending one or more beam reports to a centralized entity, wherein determining to establish the first connection and determining to establish the second connection are based on one or more commands received from the centralized entity based on the one or more beam reports.

Aspect 12 is an apparatus for wireless communication including a transceiver, a memory configured to store instructions, and one or more processors communicatively coupled with the transceiver and the memory, wherein the one or more processors are configured to execute the instructions to perform the operations of one or more methods in any of Aspects 1 to 11.

Aspect 13 is an apparatus for wireless communication, including means for performing the operations of one or more methods in any of Aspects 1 to 11.

Aspect 14 is a computer-readable medium, including code executable by one or more processors to perform the operations of one or more methods in any of Aspects 1 to 11.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, hardwiring, or combinations of any of these. Features implementing functions may also be physically located at various positions, including being distributed such that portions of functions are implemented at different physical locations. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. Also, as used herein, including in the claims, "or" as used in a list of items prefaced by "at least one of" indicates a disjunctive list such that, for example, a list of "at least one of A, B, or C" means A or B or C or AB or AC or BC or ABC (A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of wireless communication, comprising:
   determining, by a node, to establish a first connection with a first upstream node for receiving downlink communications for transmitting to a device;
   determining, by the node, based on the first upstream node being unable to receive a transmit beam from the node at at least a threshold signal strength, to establish a second connection with a second upstream node for transmitting uplink communications received from the device, wherein the second upstream node is different from the first upstream node;
   establishing the first connection with the first upstream node based on a first transmit/receive beam pair; and
   establishing the second connection with the second upstream node based on a second transmit/receive beam pair and concurrently with the first connection established with the first upstream node.

2. The method of claim 1, wherein determining to establish the first connection is based on performing beam training and determining that a first beam from the first upstream node is desirable for downlink communications.

3. The method of claim 2, wherein determining to establish the second connection is based on performing the beam training and determining that a second beam from the second upstream node is desirable for uplink communications.

4. The method of claim 3, wherein determining to establish the first connection or determining to establish the second connection is based on comparing a first signal quality of the first beam to a first threshold or comparing a second signal quality of the second beam to a second threshold.

5. The method of claim 4, wherein the first signal quality and the second signal quality correspond to at least one of a signal-to-noise ratio (SNR) or a signal-to-interference-and-noise ratio (SINR).

6. The method of claim 1, further comprising performing beam training and sending one or more beam reports to a centralized entity indicating signal measurements of multiple beams.

7. The method of claim 6, wherein determining to establish the first connection and determining to establish the second connection are based on an indication of the first transmit/receive beam pair or the second transmit/receive beam pair received from the centralized entity based on the one or more beam reports.

8. The method of claim 1, wherein the node, the first upstream node, or the second upstream node include at least one of an integrated access and backhaul (IAB) node, a user equipment (UE), a customer premises equipment (CPE), an access point, a relay node, or a repeater.

9. A method of wireless communication, comprising:
  determining, by a first node and based on a first transmit/receive beam pair, to establish a first connection with an upstream node for receiving downlink communications for transmitting to a device;
  determining, by the first node and based on the first node being unable to receive a transmit beam from the upstream node at at least a threshold signal strength when using the first transmit/receive beam pair, to establish, using the second transmit/receive beam pair different from the first transmit/receive beam pair, a second connection with the upstream node for transmitting uplink communications received from the device;
  establishing the first connection with the upstream node based on the first transmit/receive beam pair; and
  establishing the second connection with the upstream node based on the second transmit/receive beam pair concurrently with the first connection established with the upstream node.

10. The method of claim 9, wherein determining to establish the first connection is based on performing beam training and determining that a first beam from the upstream node is desirable for downlink communications and determining that a second beam from the upstream node is desirable for uplink communications.

11. The method of claim 10, wherein determining to establish the first connection or determining to establish the second connection is based on comparing a first signal quality of the first beam to a first threshold or comparing a second signal quality of the second beam to a second threshold.

12. The method of claim 11, wherein the first signal quality and the second signal quality correspond to at least one of a signal-to-noise ratio (SNR) or a signal-to-interference-and-noise ratio (SINR).

13. The method of claim 9, further comprising performing beam training and sending one or more beam reports to a centralized entity indicating signal measurements of multiple beams.

14. The method of claim 13, wherein determining to establish the first connection and determining to establish the second connection are based on an indication of the first transmit/receive beam pair or the second transmit/receive beam pair received from the centralized entity based on the one or more beam reports.

15. The method of claim 9, wherein the first node or the upstream node include at least one of an integrated access and backhaul (IAB) node, a user equipment (UE), a customer premises equipment (CPE), an access point, a relay node, or a repeater.

16. An apparatus for wireless communication, comprising:
  a transceiver;
  a memory configured to store instructions; and
  one or more processors communicatively coupled with the transceiver and the memory, wherein the one or more processors are configured to:
    determine to establish a first connection with a first upstream node for receiving downlink communications for transmitting to a device;
    determine, based on the first upstream node being unable to receive a transmit beam from the apparatus at at least a threshold signal strength, to establish a second connection with a second upstream node for transmitting uplink communications received from the device, wherein the second upstream node is different from the first upstream node;
    establish the first connection with the first upstream node based on a first transmit/receive beam pair; and
    establish the second connection with the second upstream node based on a second transmit/receive beam pair and concurrently with the first connection established with the first upstream node.

17. The apparatus of claim 16, wherein the one or more processors are configured to determine to establish the first connection based on performing beam training and determining that a first beam from the first upstream node is desirable for downlink communications.

18. The apparatus of claim 17, wherein the one or more processors are configured to determine to establish the second connection based on performing the beam training and determining that a second beam from the second upstream node is desirable for uplink communications.

19. The apparatus of claim 18, wherein the one or more processors are configured to determine to establish the first connection or determine to establish the second connection based on comparing a first signal quality of the first beam to a first threshold or comparing a second signal quality of the second beam to a second threshold.

20. The apparatus of claim 19, wherein the first signal quality and the second signal quality correspond to at least one of a signal-to-noise ratio (SNR) or a signal-to-interference-and-noise ratio (SINR).

21. The apparatus of claim 16, wherein the one or more processors are further configured to perform beam training and send one or more beam reports to a centralized entity indicating signal measurements of multiple beams.

22. The apparatus of claim 21, wherein the one or more processors are configured to determine to establish the first connection and determine to establish the second connection based on an indication of the first transmit/receive beam pair or the second transmit/receive beam pair received from the centralized entity based on the one or more beam reports.

23. The apparatus of claim 16, wherein the apparatus, the first upstream node, or the second upstream node include at least one of an integrated access and backhaul (IAB) node, a user equipment (UE), a customer premises equipment (CPE), an access point, a relay node, or a repeater.

24. An apparatus for wireless communication, comprising:
  a transceiver;
  a memory configured to store instructions; and one or more processors communicatively coupled with the transceiver and the memory, wherein the one or more processors are configured to:

determine to establish, based on a first transmit/receive beam pair, a first connection with an upstream node for receiving downlink communications for transmitting to a device;

determine to establish, based on the first node being unable to receive a transmit beam from the upstream node at at least a threshold signal strength when using the first transmit/receive beam pair, to establish, using the second transmit/receive beam pair different from the first transmit/receive beam pair, a second connection with the upstream node for transmitting uplink communications received from the device;

establish the first connection with the upstream node based on the first transmit/receive beam pair; and establish the second connection with the upstream node based on the second transmit/receive beam pair concurrently with the first connection established with the upstream node.

25. The apparatus of claim 24, wherein the one or more processors are configured to determine to establish the first connection based on performing beam training and determining that a first beam from the upstream node is desirable for downlink communications and determining that a second beam from the upstream node is desirable for uplink communications.

26. The apparatus of claim 25, wherein the one or more processors are configured to determine to establish the first connection or determine to establish the second connection based on comparing a first signal quality of the first beam to a first threshold or comparing a second signal quality of the second beam to a second threshold.

27. The apparatus of claim 26, wherein the first signal quality and the second signal quality correspond to at least one of a signal-to-noise ratio (SNR) or a signal-to-interference-and-noise ratio (SINR).

28. The apparatus of claim 24, wherein the one or more processors are further configured to perform beam training and sending one or more beam reports to a centralized entity indicating signal measurements of multiple beams.

29. The apparatus of claim 28, wherein the one or more processors are configured to determine to establish the first connection and determine to establish the second connection based on an indication of the first transmit/receive beam pair or the second transmit/receive beam pair received from the centralized entity based on the one or more beam reports.

30. The apparatus of claim 24, wherein the apparatus or the upstream node include at least one of an integrated access and backhaul (IAB) node, a user equipment (UE), a customer premises equipment (CPE), an access point, a relay node, or a repeater.

* * * * *